US012779851B2

(12) United States Patent
Kanda

(10) Patent No.: US 12,779,851 B2
(45) Date of Patent: Nov. 3, 2026

(54) LIQUID EJECTION HEAD AND MANUFACTURING METHOD OF SAME

(71) Applicant: CANON KABUSHIKI KAISHA, Tokyo (JP)

(72) Inventor: Toru Kanda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 18/812,129

(22) Filed: Aug. 22, 2024

(65) Prior Publication Data

US 2025/0074058 A1 Mar. 6, 2025

(30) Foreign Application Priority Data

Aug. 30, 2023 (JP) ................................ 2023-139519

(51) Int. Cl.
*B41J 2/16* (2006.01)
*B41J 2/14* (2006.01)

(52) U.S. Cl.
CPC ......... *B41J 2/1623* (2013.01); *B41J 2/14072* (2013.01); *B41J 2/1601* (2013.01); *B41J 2202/19* (2013.01); *B41J 2202/22* (2013.01)

(58) Field of Classification Search
CPC ... B41J 2/1623; B41J 2202/19; B41J 2/14024
See application file for complete search history.

(56) References Cited

U.S. PATENT DOCUMENTS

| | | | | |
|---|---|---|---|---|
| 11,084,286 B2 | | 8/2021 | Ninagawa | |
| 2022/0371322 A1 | * | 11/2022 | Iwano | B41J 2/14024 |
| 2024/0217233 A1 | * | 7/2024 | Mori | B41J 2/14024 |

FOREIGN PATENT DOCUMENTS

| | | | | |
|---|---|---|---|---|
| JP | 2020-97159 A | | 6/2020 | |
| JP | 2022191015 A | * | 12/2022 | B41J 2/1635 |

* cited by examiner

*Primary Examiner* — Sharon Polk
(74) *Attorney, Agent, or Firm* — Venable LLP

(57) ABSTRACT

Provided are a liquid ejection head with high reliability against a temperature change and a manufacturing method of the same. To this end, a wiring board is adhered to a support member by a first adhesive agent, and is adhered to a channel member by a second adhesive agent whose Young's modulus after curing is lower than that of the first adhesive agent. The support member is adhered to the channel member by a third adhesive agent whose Young's modulus after curing is lower than that of the first adhesive agent, and the Young's modulus of the second adhesive agent after curing is lower than those of the first adhesive agent and the third adhesive agent.

12 Claims, 10 Drawing Sheets

LIQUID EJECTION HEAD AND MANUFACTURING METHOD OF SAME

BACKGROUND OF THE DISCLOSURE

Field of the Disclosure

The present disclosure relates to a liquid ejection head and a manufacturing method of the same.

Description of the Related Art

A liquid ejection head that performs printing or the like by ejecting liquid includes an element substrate manufactured by using a silicon substrate. A wiring board is generally electrically connected to the element substrate. Such a wiring board is joined while extending across multiple members including the element substrate. The members and the wiring board are made of different materials in many cases, and the linear expansion coefficients thereof vary in some cases. Assume a case where the linear expansion coefficients of the wiring board and the members vary. If the wiring board is attempted to be joined to the members with tension applied to the wiring board, a temperature change causes stress to be applied to the wiring board, and there is a possibility of breakage of wiring in the wiring board.

Japanese Patent Laid-Open No. 2020-97159 describes a technique in which, in the case where a wiring board is adhered between an element substrate and a support member, different adhesive agents are used, respectively, in both end portions of the wiring board. Moreover, a minimum distance between a first adhesive agent adhering one end portion and a second adhesive agent adhering the other end portion is made shorter than a distance between the first adhesive agent and the second adhesive agent along the wiring board, and tension is thereby made less likely to be applied to the wiring board to improve reliability against a temperature change.

Although there is a method in which looseness is provided in the wiring board to make tension less likely to be applied to the wiring board as in Japanese Patent Laid-Open No. 2020-97159, in control of the looseness provided in the wiring board, the amount, thickness, width, and the like of adhesive agent are difficult to control. In the case where the amount or the like of adhesive agent is not properly controlled, there is a possibility of breakage of wiring.

SUMMARY OF THE DISCLOSURE

Accordingly, the present disclosure provides a liquid ejection head with high reliability against a temperature change and a manufacturing method of the liquid ejection head.

A liquid ejection head of the present disclosure for this object is a liquid ejection head comprising: an ejection module including an element substrate in which an element for ejecting liquid is formed, a support member supporting the element substrate, and a wiring board electrically connected to the element substrate; and a channel member that supports the ejection module and in which a channel for supplying the liquid to be ejected by the element substrate is formed, wherein the wiring board is adhered to the support member by a first adhesive agent, and is adhered to the channel member by a second adhesive agent, the support member is adhered to the channel member by a third adhesive agent whose Young's modulus after curing is lower than the Young's modulus of the first adhesive agent after curing, and a Young's modulus of the second adhesive agent after curing is lower than the Young's moduli of the first adhesive agent and the third adhesive agent after curing.

The present disclosure can provide a liquid ejection head with high reliability against a temperature change and a manufacturing method of the liquid ejection head.

Further features of the present disclosure will become apparent from the following description of exemplary embodiments with reference to the attached drawings.

DESCRIPTION OF THE EMBODIMENTS

An embodiment of the present disclosure is explained below with reference to the drawings.

Figure 1:
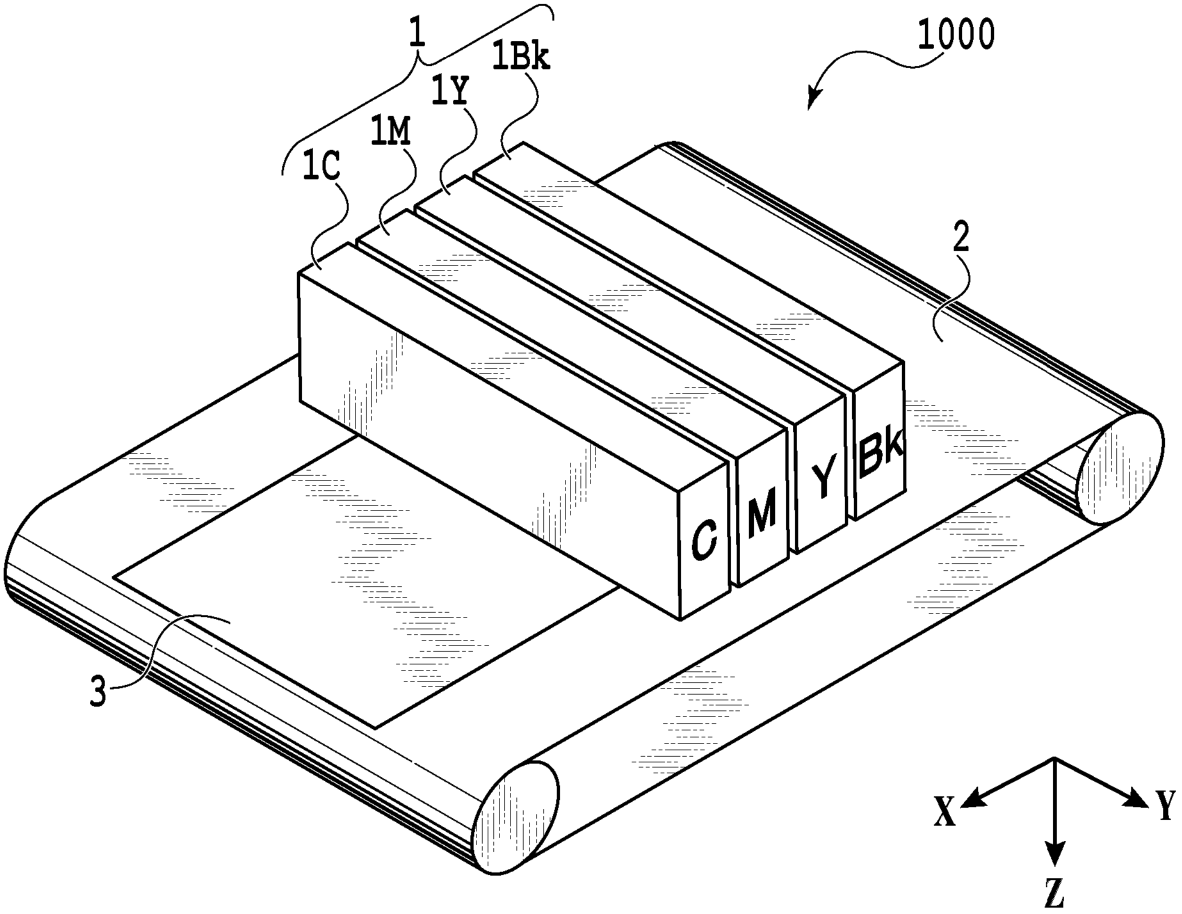
FIG. 1 is a perspective diagram illustrating a main portion of a liquid ejection apparatus.

FIG. 1 is a perspective diagram illustrating a main portion of a liquid ejection apparatus 1000 in the present embodiment. The liquid ejection apparatus 1000 of the present embodiment is a liquid ejection apparatus (hereinafter, also simply referred to as apparatus) that prints a color image on a print medium 3 by ejecting inks of cyan (C), magenta (M), yellow (Y), and black (Bk). In FIG. 1, an X direction is a conveyance direction of the print medium 3, a Y direction is a width direction of the print medium, and a Z direction is a direction intersecting the X direction and the Y direction, and is a direction in which the liquids are ejected.

FIG. 1 illustrates the apparatus 1000 having such a form that liquid ejection heads 1 directly apply the inks to the print medium 3 conveyed in the X direction. The print medium 3 is mounted on a conveyance unit 2, and is conveyed to a position where the print medium 3 faces the four liquid ejection heads 1 (1C, 1M, 1Y, and 1Bk) that eject different inks. The four liquid ejection heads 1 are arranged in the order of 1Bk, 1Y, 1M, and 1C in the X direction, and the inks are applied to the print medium 3 in the order of black, yellow, magenta, and cyan. In each of the liquid ejection heads 1, multiple ejection ports from which the ink is ejected are aligned in the Y direction.

Note that, although a cut paper is illustrated as the print medium 3, the print medium 3 may be a continuous paper supplied from a roll paper. Moreover, the print medium 3 is not limited to paper, and may be, for example, a film or the like.

Moreover, although an example of the liquid ejection apparatus with the configuration in which one liquid ejection head 1 ejects a single color of ink is illustrated in the present embodiment, the configuration may be such that one liquid ejection head ejects multiple colors of inks.

Figure 2A:
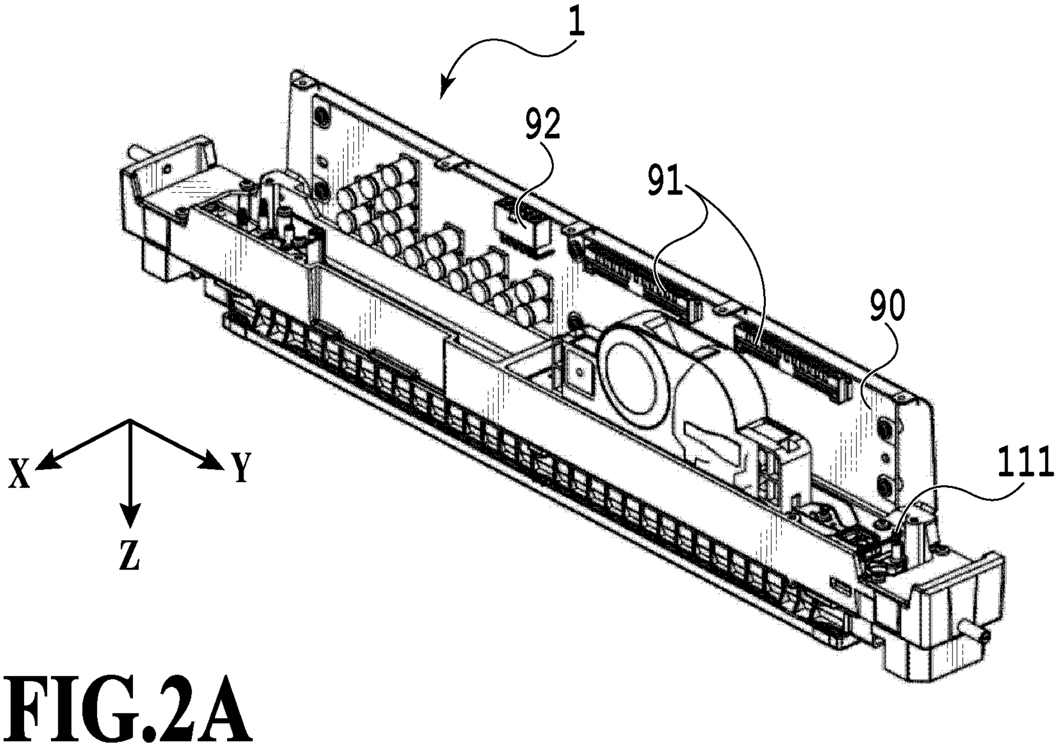
FIG. 2A is a perspective diagram illustrating a liquid ejection head.
Figure 2B:
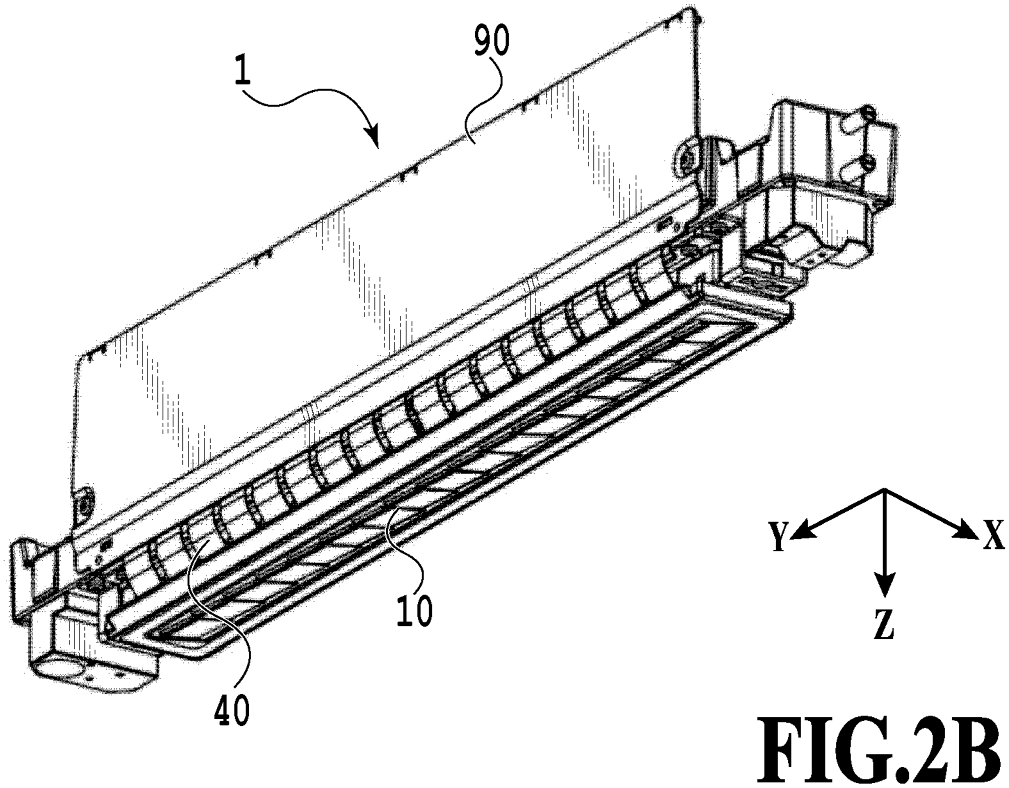
FIG. 2B is a perspective diagram illustrating the liquid ejection head.

FIGS. 2A and 2B are perspective diagrams illustrating the liquid ejection head 1 according to the present embodiment. The liquid ejection head 1 is a line liquid ejection head in which 17 element substrates 10 capable of ejecting the ink are aligned in a straight line (arranged in line). The liquid ejection head 1 includes a signal input terminal 91 and an electric power terminal 92 electrically connected to the element substrates 10 via flexible printed circuit boards 40 and a printed wiring board 90. The signal input terminal 91 and the electric power terminal 92 are electrically connected to a control unit of the apparatus 1000, and supply, respectively, an ejection drive signal and electric power necessary for ejection to the element substrates 10 via the flexible printed circuit boards 40. Integrating wiring lines by using an electric circuit inside the printed wiring board 90 can make the numbers of signal input terminals 91 and electric power terminals 92 smaller than the number of element substrates 10. This can reduce the number of electric connecting portions that need to be removed in attaching of the liquid ejection head 1 to the apparatus 1000 or in replacement of the liquid ejection head 1.

As illustrated in FIG. 2A, a liquid connecting portion 111 provided on one side of the liquid ejection head 1 is connected to a liquid supply system of the apparatus 1000. The ink is thereby supplied from the supply system of the apparatus 1000 to the liquid ejection head 1, and the ink having passed inside the liquid ejection head 1 is collected into the supply system of the apparatus 1000. As described above, the configuration is such that the ink can circulate through a path in the apparatus 1000 and a path in the liquid ejection head 1.

Figure 3:
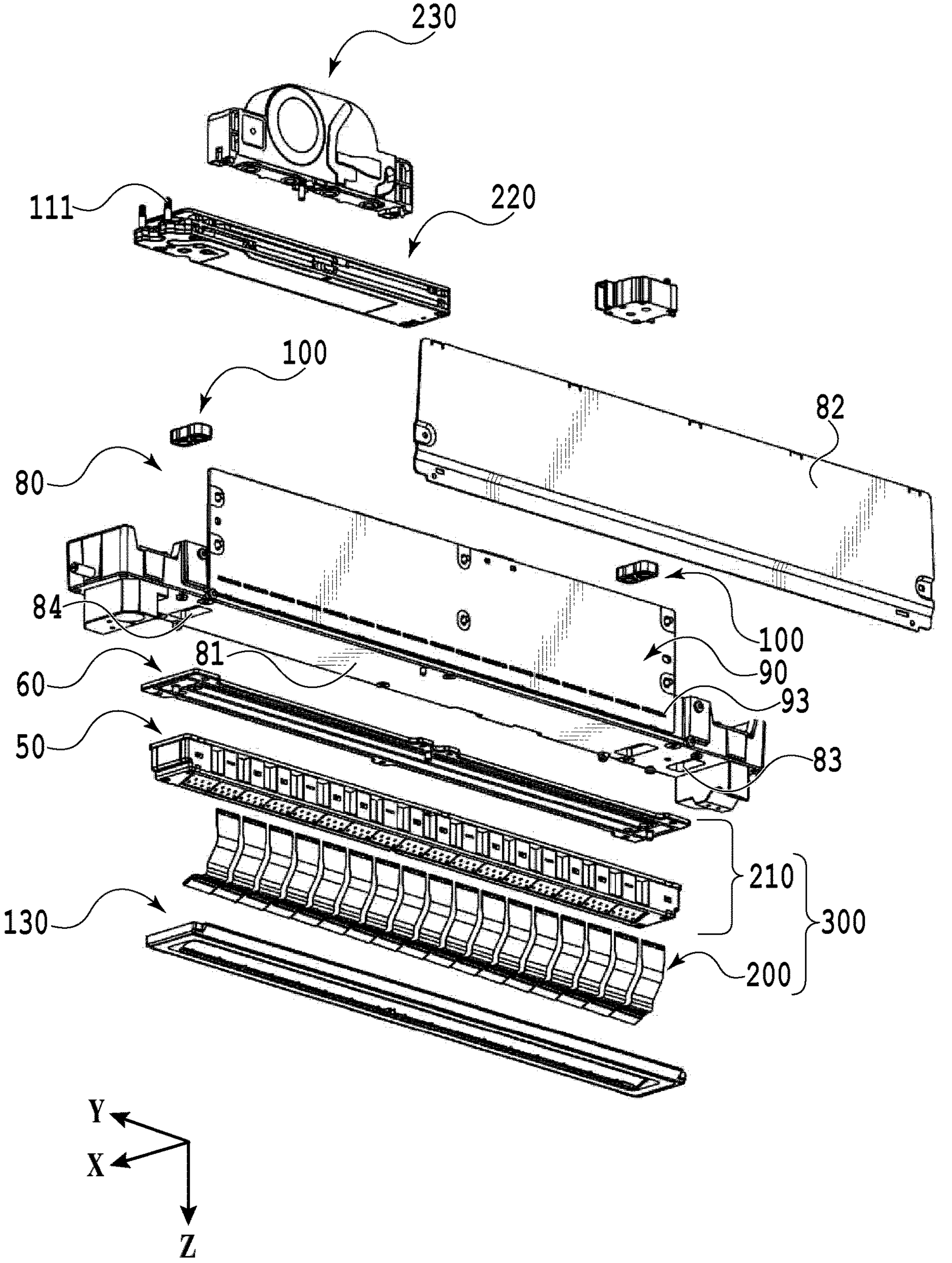
FIG. 3 is an exploded perspective diagram of parts or units forming the liquid ejection head.

FIG. 3 is an exploded perspective diagram of parts or units forming the liquid ejection head 1. A liquid ejection unit 300, a liquid supply unit 220, and the printed wiring board 90 are attached to a case 80. The liquid connecting portion 111 is provided in the liquid supply unit 220, and a filter communicating with each of openings of the liquid connecting portion 111 is provided inside the liquid supply unit 220 to remove foreign substances in the supplied ink. The liquid having passed filter is supplied to a negative pressure control unit 230 arranged on the liquid supply unit 220.

The negative pressure control unit 230 is a unit including a pressure adjustment valve, and attenuates a pressure drop change in the supply system of the apparatus 1000 (supply system upstream of the liquid ejection head 1) that occurs with fluctuation in a flow rate of the liquid, by using an action of a valve, a spring member, or the like provided inside the negative pressure control unit 230. A negative pressure change downstream (on the liquid ejection unit 300 side) of the negative pressure control unit 230 can be thereby stabilized to be within a certain range. Two pressure adjustment valves are included inside the negative pressure control unit 230. The two pressure adjustment valves are set to different control pressures, respectively. The high pressure side communicates with a common supply channel in the liquid ejection unit 300 via the liquid supply unit 220, and the low pressure side communicates with a common collection channel via the liquid supply unit 220.

The case 80 includes a liquid ejection unit supporting portion 81 and an electric wiring board supporting portion 82, supports the liquid ejection unit 300 and the printed wiring board 90, and secures the stiffness of the liquid ejection head 1. The electric wiring board supporting portion 82 supports the printed wiring board 90, and is fixed to the liquid ejection unit supporting portion 81 by screws. Openings 83 and 84 in which joint rubbers 100 are inserted are provided in the liquid ejection unit supporting portion 81. The liquid supplied from the liquid supply unit 220 is guided to a second channel member 60 forming the liquid ejection unit 300, via the joint rubbers 100.

Next, a configuration of a channel member 210 included in the liquid ejection unit 300 is explained. As illustrated in FIG. 3, the channel member 210 is formed by laminating a first channel member 50 and the second channel member 60 to each other. Channels through which the liquid flows are formed in the first channel member 50 and the second channel member 60, and multiple ejection modules 200 are joined to a joining surface of the first channel member 50 by an adhesive agent (not illustrated). The channel member 210 is a channel member that distributes the liquid supplied from the liquid supply unit 220 to each of the ejection modules 200 and that returns the liquid flowing out from the ejection modules 200 to the liquid supply unit 220. Moreover, the channel member 210 is fixed to the liquid ejection unit supporting portion 81 by screws to suppress warping and deformation.

Figure 4A:
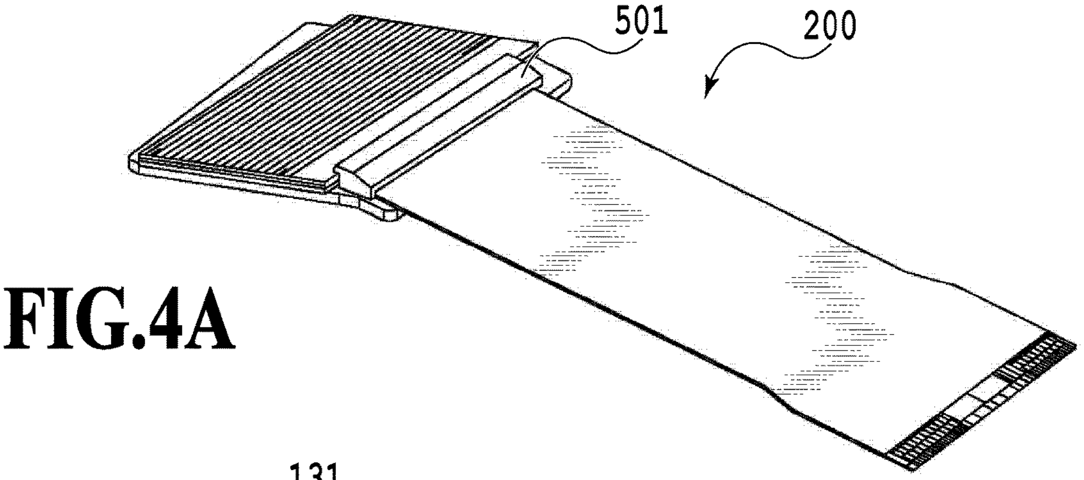
FIG. 4A is a perspective diagram illustrating an ejection module.
Figure 4B:
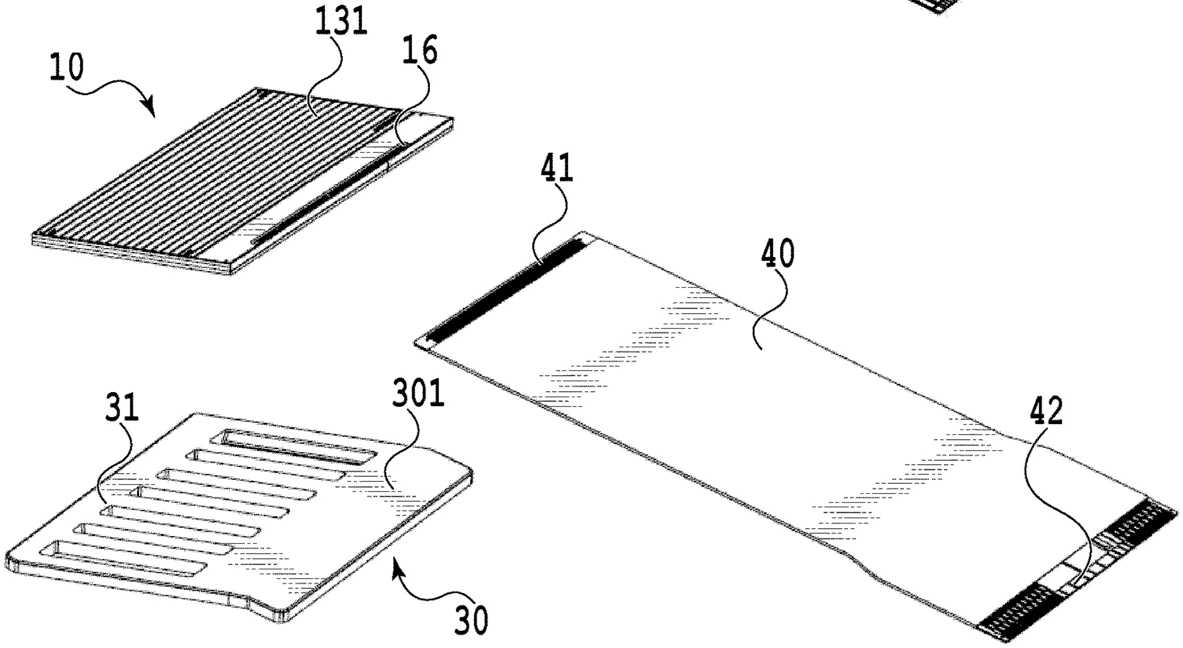
FIG. 4B is a perspective diagram illustrating the ejection module.

FIGS. 4A and 4B are perspective diagrams illustrating the ejection module 200. Moreover, FIG. 4C is an enlarged diagram of a portion around ejection ports 13 in the element substrate 10.

In the ejection module 200, the element substrate 10 and the flexible printed circuit board 40 are joined to a surface 301 (first surface 301) of a support member 30 provided with support member communication ports 31, by using an adhesive agent. Details of joining the element substrate 10 and the flexible printed circuit board 40 to the support member 30 are described later. A surface of the element substrate 10 on the opposite side to an ejection port surface 131 provided with the ejection ports 13 is supported on the first surface 301 of the support member 30. A terminal 16 on the element substrate 10 and a terminal 41 on the flexible printed circuit board 40 are electrically connected to each other by a wire (electrical connection member). Moreover, the wire is sealed by being covered with a sealing agent A501. Note that a terminal 42 of the flexible printed circuit board 40 on the opposite side to the element substrate 10 is electrically connected to a connection terminal 93 (see FIG. 3) of the printed wiring board 90.

The support member 30 is a support medium that supports the element substrate 10, and is also a channel member that allows the element substrate 10 and the channel member 210 to fluidly communicate with each other. Accordingly, the support member 30 is preferably a member that has high flatness and that can be joined with sufficiently high reliability. The material of the support member 30 is preferably, for example, alumina or a resin material. Moreover, instead of the wires, inner leads or the like can be used as the electrical connection member connecting the element substrate 10 and the flexible printed circuit board 40 and an electrical connection member connecting the flexible printed circuit board 40 and the printed wiring board 90.

Figure 4C:
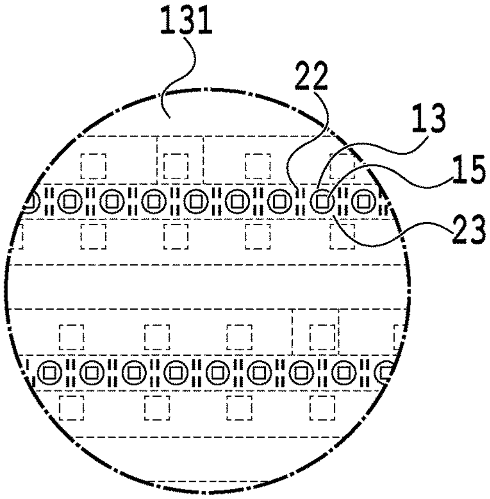
FIG. 4C is an enlarged diagram illustrating the ejection module.

As illustrated in FIG. 4C, the element substrate 10 has multiple ejection port arrays in which the multiple ejection ports 13 are aligned. An energy generating element 15 that is a heat generating element (pressure generating element)

configured to cause the liquid to bubble by using heat energy is arranged at a position corresponding to each ejection port 13. Partitions 22 define pressure chambers 23 each including the energy generating element 15 therein. The energy generating element 15 is electrically connected to the terminal 16 by electric wiring (not illustrated) provided in the element substrate 10. The energy generating element 15 generates heat and boils the liquid based on a pulse signal inputted from a control circuit of the apparatus 1000 via the printed wiring board 90 (see FIG. 3) and the flexible printed circuit board 40. The liquid is ejected from the ejection port 13 by force of bubbling caused by this boiling.

Figure 5:
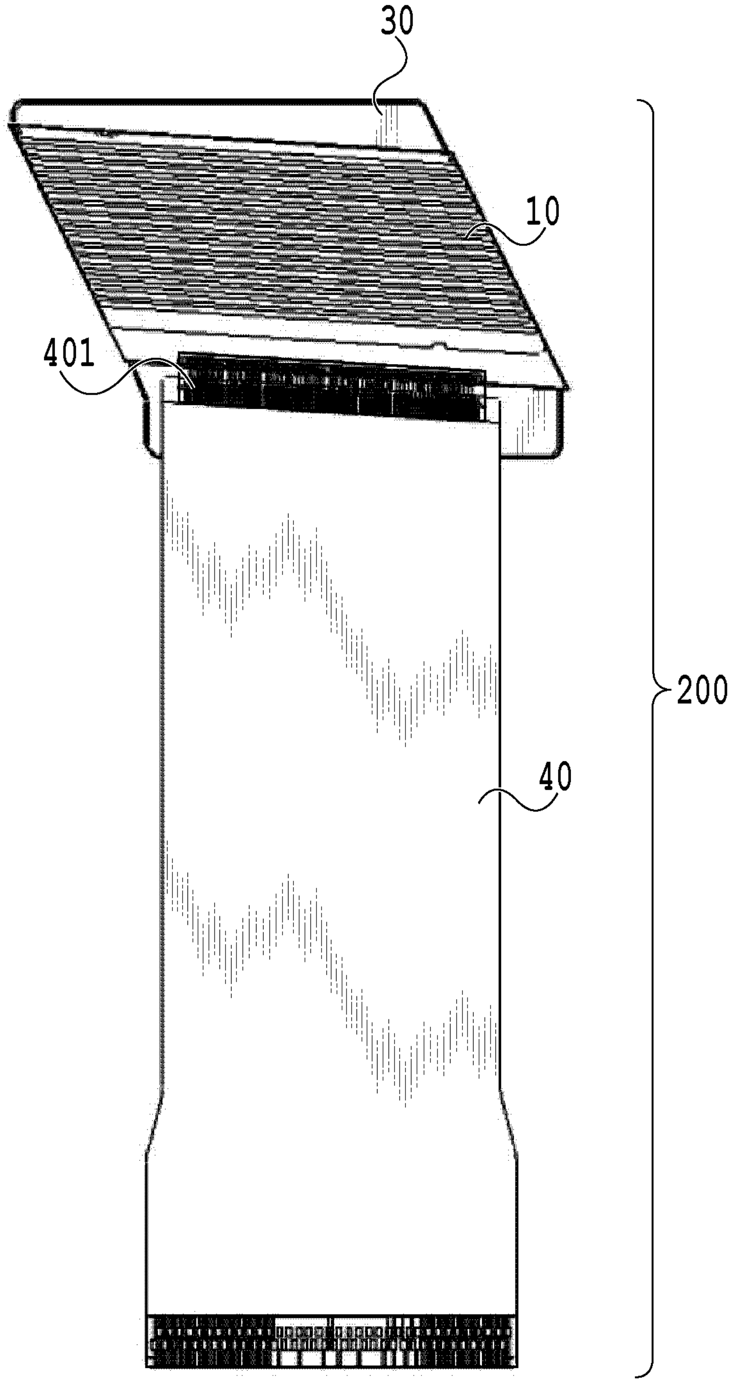
FIG. 5 is a diagram illustrating the ejection module before sealing agent application.
Figure 6:
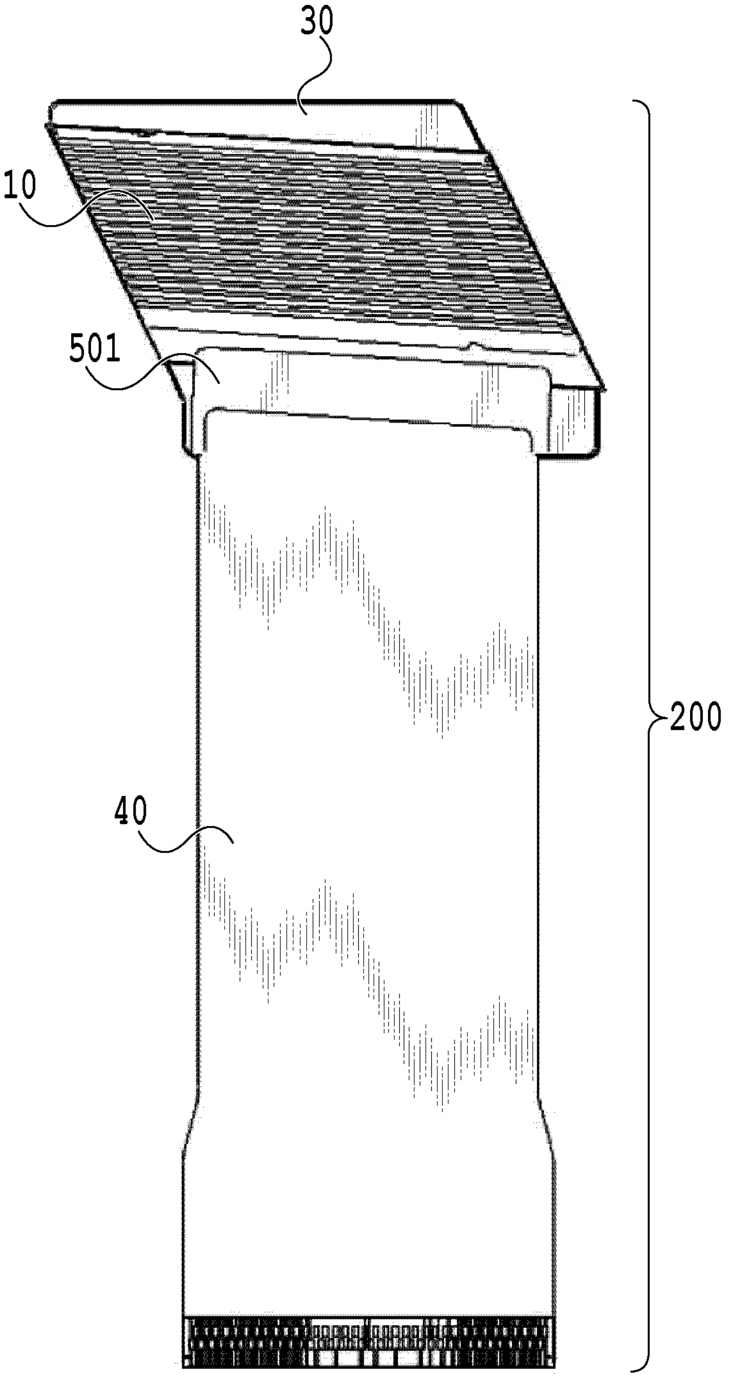
FIG. 6 is a diagram illustrating the ejection module after the sealing agent application.
Figure 7:
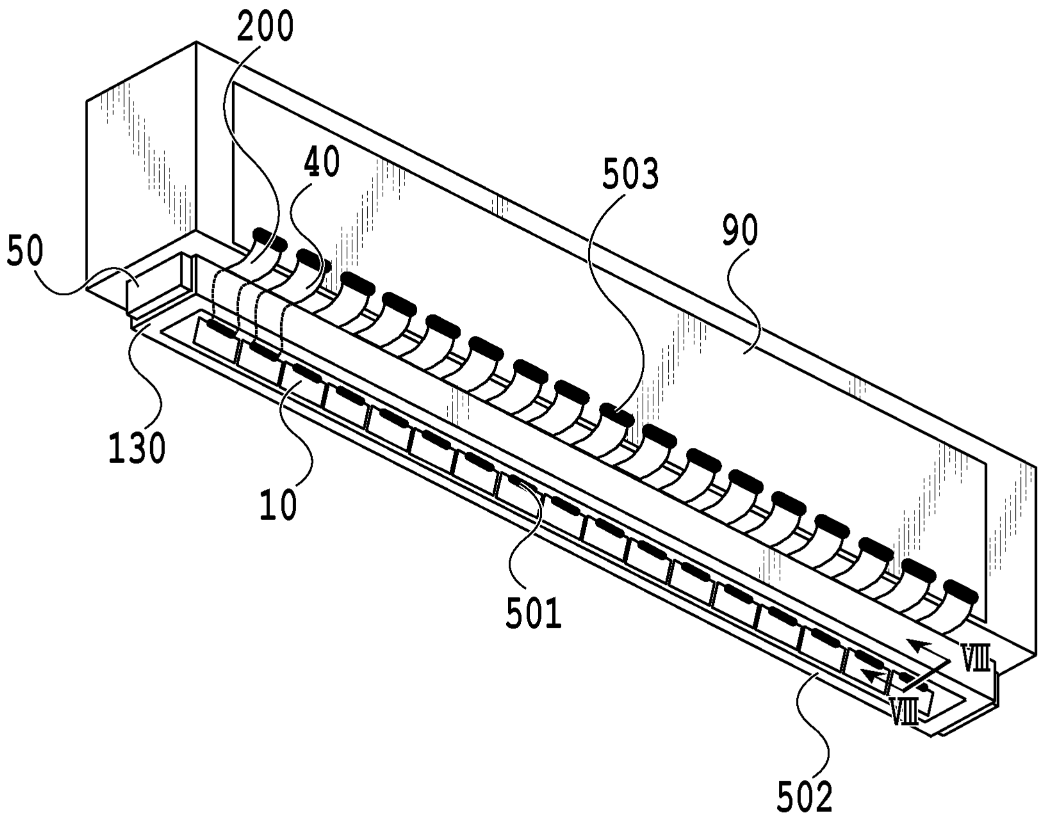
FIG. 7 is a perspective diagram illustrating the liquid ejection head.
Figure 8:
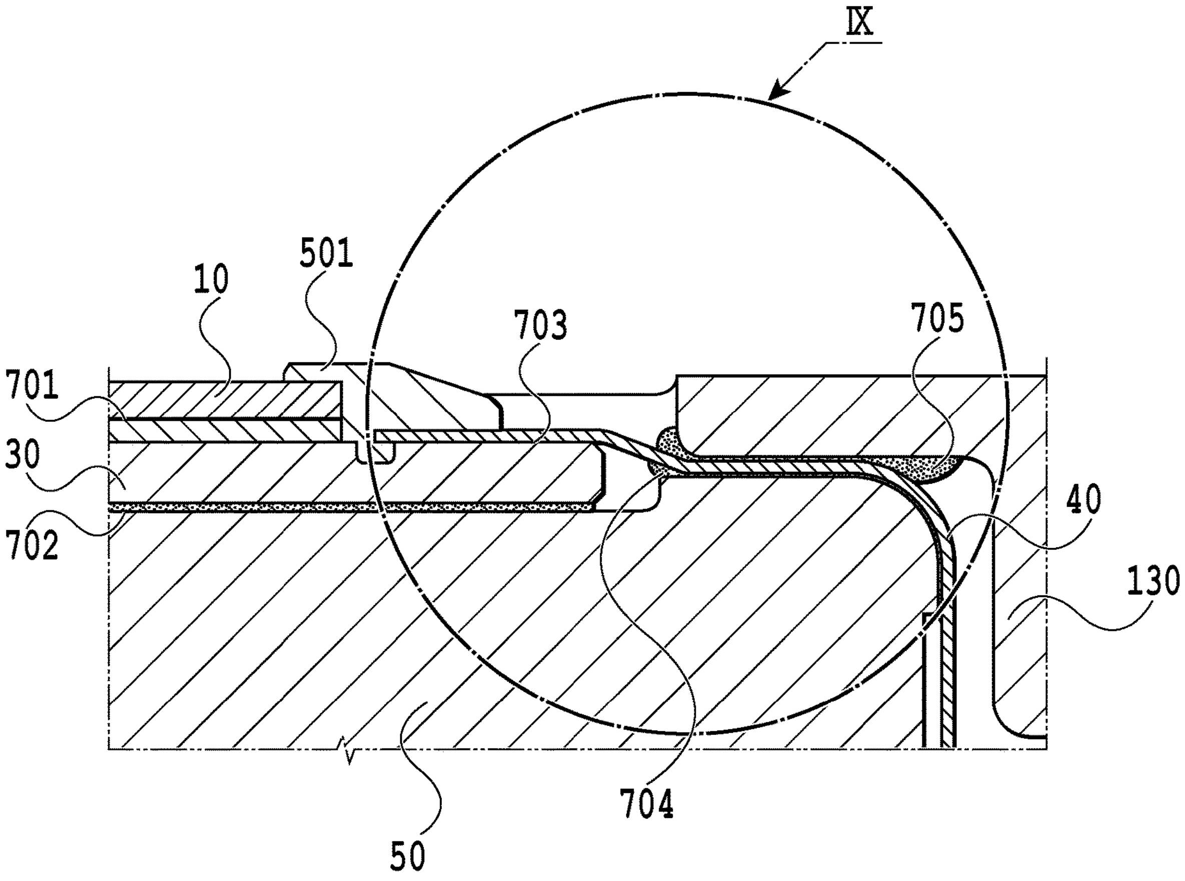
FIG. 8 is a cross-sectional diagram at VIII-VIII in FIG. 7.
Figure 9:
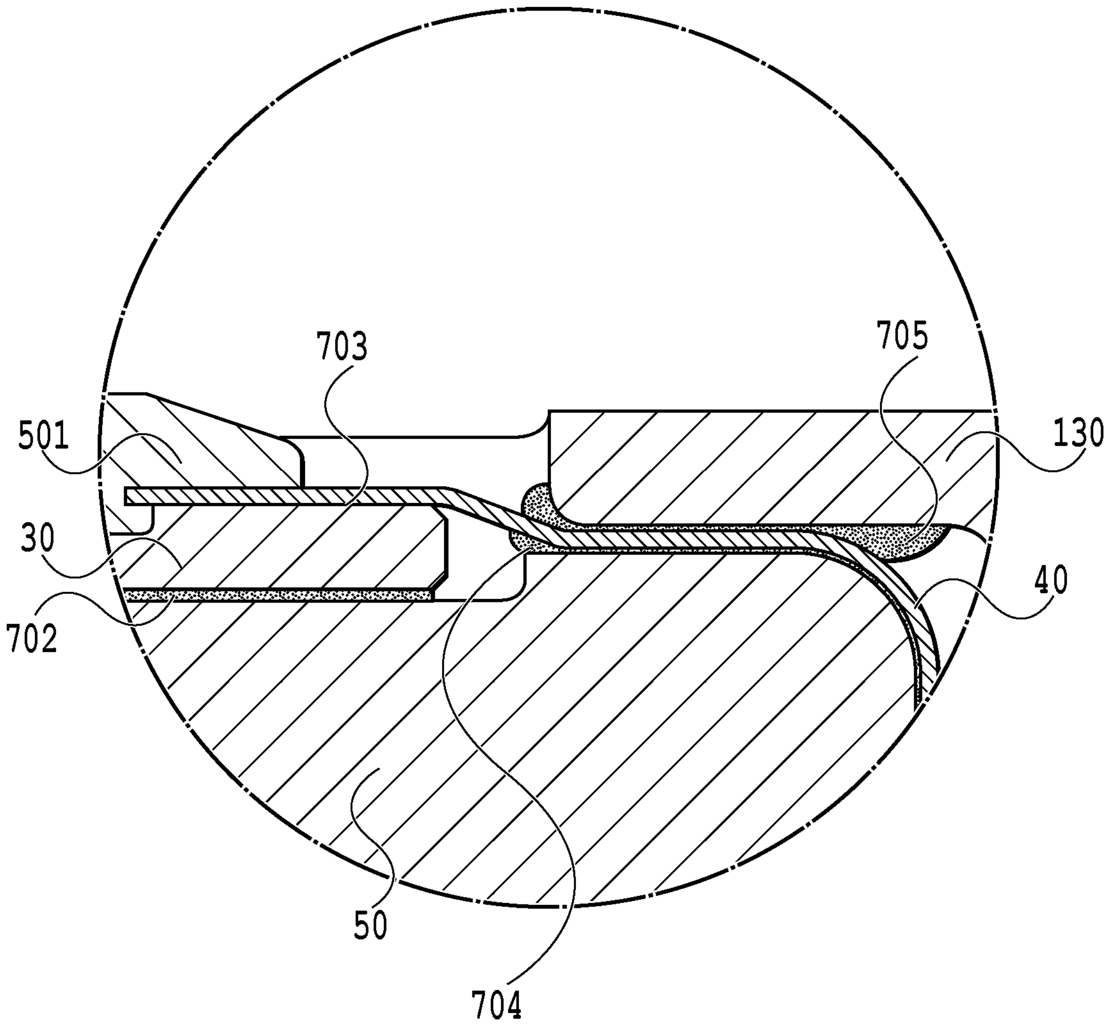
FIG. 9 is an enlarged diagram illustrating a B portion of FIG. 8.

FIG. 5 is a diagram illustrating the ejection module 200 before application of the sealing agent in the present embodiment. FIG. 6 is a diagram illustrating the ejection module 200 after the application of the sealing agent in the present embodiment. Moreover, FIG. 7 is a perspective diagram illustrating the liquid ejection head 1, and FIG. 8 is a cross-sectional diagram at VIII-VIII in FIG. 7. FIG. 9 is an enlarged diagram illustrating an IX portion in FIG. 8. The element substrate 10 is joined onto the support member 30 by an adhesive agent A701. Moreover, the flexible printed circuit board 40 is joined onto the support member 30 by an adhesive agent C703. The flexible printed circuit board 40 only needs to be flexible wiring, and a FPC, a TAB, or the like is used.

An epoxy resin, an acryl resin, an epoxy acrylate resin, an imide resin, an amide resin, and the like can be given as the adhesive agent A701 and the adhesive agent C703. Moreover, two-component mixing curing in which a curing agent is mixed, thermosetting performed by heating, UV curing performed by ultraviolet irradiation, and the like can be given as a method of curing the adhesive agent A701 and the adhesive agent C703.

The element substrate 10 and one end of the flexible printed circuit board 40 are electrically connected to each other. Methods of electrical connection between the element substrate 10 and the flexible printed circuit board 40 include wire bonding in which connection is achieved by metal wires, gang bonding in which connection is achieved by inner leads of the flexible printed circuit board 40, and the like. The sealing agent A501 is applied to lower portions and upper portions of electrically-connected wires 401 (see FIG. 5), and seals the wires 401 to insulate and protect the wires 401. The ejection module 200 is thereby completed.

As illustrated in FIGS. 7 and 8, one or multiple ejection modules 200 are arranged on the first channel member 50, and joined to the first channel member 50 by an adhesive agent B702. The flexible printed circuit board 40 of each ejection module 200 joined to the first channel member 50 is joined and fixed to the first channel member 50 by an adhesive agent D704. Moreover, the other end of the flexible printed circuit board 40 of the ejection module 200 is adhered and fixed to the printed wiring board 90 to be electrically connected thereto. Methods of electrical connection between the flexible printed circuit board 40 and the printed wiring board 90 include wire bonding in which connection is achieved by metal wires, gang bonding in which connection is achieved by inner leads of the flexible printed circuit board 40, and the like. This electrical connecting portion is covered with a sealing agent C503 to be insulated and protected. A frame member 130 is joined by an adhesive agent E705 to surround the element substrates 10 of the multiple ejection modules 200 arranged on and joined to the first channel member 50.

A sealing agent B502 is applied between the element substrates 10 and the frame member 130, and the liquid ejection head 1 is completed. The sealing agent B502 is cured by lapse of time. As illustrated in FIG. 8, the flexible printed circuit board 40 is in a sandwiched state between the first channel member 50 and the frame member 130.

In the present embodiment, the material of the support member 30 is alumina, and the thickness of the support member 30 is 1 mm. The flexible printed circuit board 40 is an FPC in which wiring is embedded in a film, and an FPC with a linear expansion coefficient of 16.5 ppm and a thickness of 0.2 mm is used. A resin material with a linear expansion coefficient of 30.1 ppm is used as the first channel member 50. The element substrate 10 is adhered and joined to the support member 30 by the adhesive agent A701, and the flexible printed circuit board 40 is further adhered and joined to the support member 30 by the adhesive agent C703. A wire bonding method using gold wires with an outer diameter of 30 μm is used as the method of electrical connection between the element substrate 10 and the flexible printed circuit board 40. A thermosetting epoxy resin is used as the sealing agent A501.

A surface of the first channel member 50 joined to the ejection modules 200 has a recess shape, and the height of a step of a recess portion is 0.6 mm. The support member 30 of each ejection module 200 is arranged in the recess portion of the first channel member 50, and is adhered and joined by using the adhesive agent B702. In the present embodiment, 17 ejection modules 200 are aligned on the first channel member 50, and the adhesive agent B702 is cured through a thermal treatment step.

The position of each element substrate 10 in the liquid ejection head 1 affects landing accuracy of ejected liquid, that is to say greatly affects quality of printing using the ejected liquid. Accordingly, the adhesive agent A701 used for the fixing of the element substrate 10 to the support member 30 and the adhesive agent B702 used for the fixing of the support member 30 to the first channel member 50 need to be a material that has sufficient hardness after the curing. For example, an adhesive agent with a Young's modulus of about 0.4 GPa or more and 10 GPa or less is desirably used as the adhesive agent A701 and the adhesive agent B702. In the present embodiment, a thermosetting epoxy resin with a Young's modulus of about 1.1 GPa after the curing is used as the adhesive agent A701 and the adhesive agent B702.

Since the flexible printed circuit board 40 is electrically connected by the wires with the outer diameter of 30 m, the flexible printed circuit board 40 needs to be adhered by the adhesive agent C703 with sufficient holding power to prevent breakage of the wires due to movement of the flexible printed circuit board 40. For example, an adhesive agent with a Young's modulus of 0.4 GPa or more and 10 GPa or less is desirably used as the adhesive agent C703. In the present embodiment, a thermosetting epoxy resin with a Young's modulus of about 0.96 GPa after the curing is used as the adhesive agent C703.

As illustrated in FIGS. 8 and 9, an intermediate portion of the flexible printed circuit board 40 of the ejection module 200 is adhered and joined to an outer peripheral portion of the first channel member 50 by using the adhesive agent D704. In this case, the flexible printed circuit board 40 is adhered and fixed like a bridge connecting the support member 30 and the first channel member 50.

The liquid ejection head 1 is sometimes exposed to a high-temperature or low-temperature environment depending on heat generated by the element substrates 10, a used environment, or a distribution environment. In such a temperature change, the various members thermally contract. In particular, the thermal contraction of the first channel member 50 using a resin member is large. In the case where the first channel member 50 thermally contracts due to a temperature change, large tensile stress or contraction stress is applied to the flexible printed circuit board 40 fixed like a bridge connecting the support member 30 and the first channel member 50, and there is a possibly of part of the wiring of the flexible printed circuit board 40 breaking.

Accordingly, in the present embodiment, an adhesive agent with a lower Young's modulus than the adhesive agent C703 bonding the flexible printed circuit board 40 and the support member 30 to each other is used as the adhesive agent D704 fixing the flexible printed circuit board 40 to the first channel member 50 to reduce stress applied to the flexible printed circuit board 40. Specifically, an adhesive agent with lower stiffness than the adhesive agent C703 is used as the adhesive agent D704 fixing the flexible printed circuit board 40 to the first channel member 50. For example, an adhesive agent with a Young's modulus of about 0.005 GPa or more and 0.5 GPa or less is desirably used as the adhesive agent D704. In the present embodiment, a room temperature setting type acrylic modified silicon with a Young's modulus of about 0.15 GPa is used as the adhesive agent D704.

The adhesive agent E705 used to join the frame member 130 to the first channel member 50 is present also between the frame member 130 and the flexible printed circuit board 40, and fixes the flexible printed circuit board 40. Accordingly, an adhesive agent with a lower Young's modulus than the adhesive agent C703 is desirably used also as the adhesive agent E705 to reduce the stress applied to the flexible printed circuit board 40. In the present embodiment, the same room temperature setting type acrylic modified silicon as the adhesive agent D704 is used as the adhesive agent E705. The Young's modulus of the adhesive agent E705 only needs to be equal to or lower than the Young's modulus of the adhesive agent D704.

According to the configuration of the present embodiment, an adhesive agent with a lower Young's modulus than the adhesive agent C703 is used as the adhesive agent D704 bonding the first channel member 50 and the flexible printed circuit board 40 to each other and the adhesive agent E705 fixing the frame member 130 and the flexible printed circuit board 40 to each other. This can cause the adhesive agent D704 and the adhesive agent E705 to deform and reduce the stress generated in the flexible printed circuit board 40 due to thermal contraction of the flexible printed circuit board 40, expansion of the first channel member 50, or the like that is caused by heat generated in the element substrates 10, a change in environment temperature, or the like. The possibility of breakage of the flexible printed circuit board 40 can be thereby reduced.

The stress applied to the flexible printed circuit board 40 in the case where the Young's modulus of the adhesive agent D704 and the adhesive agent E705 is lower than the Young's modulus of the adhesive agent C703 as in the present embodiment is compared with that in the case where the Young's modulus of the adhesive agent D704 and the adhesive agent E705 is the same as the Young's modulus of the adhesive agent C703.

In the case where the adhesive agent C703 has a Young's modulus of 0.96 GPa and the same material (Young's modulus of 0.96 GPa) as the adhesive agent C703 is used for the adhesive agent D704, the stress applied to the flexible printed circuit board 40 in a temperature change from −30° C. to +100° C. is calculated to be 236 to 474 MPa.

Meanwhile, in the present embodiment in which the Young's modulus of the adhesive agent D704 and the adhesive agent E705 is lower than the adhesive agent C703 such as the case where the Young's modulus of the adhesive agent D704 and the adhesive agent E705 is 0.15 GPa, the stress applied to the flexible printed circuit board 40 in the same temperature change as that described above is 171 to 258 MPa. Specifically, it is confirmed that the stress is reduced from that in the case where the Young's modulus of the adhesive agent D704 adhering the first channel member 50 and the flexible printed circuit board 40 to each other is the same as the Young's modulus of the adhesive agent C703 adhering the flexible printed circuit board 40 and the support member 30 to each other.

Note that, although the configuration in which 17 ejection modules 200 are arranged on the first channel member 50 is explained in the present embodiment, similar effects can be obtained also in a configuration in which one ejection module 200 is joined.

Figure 10:
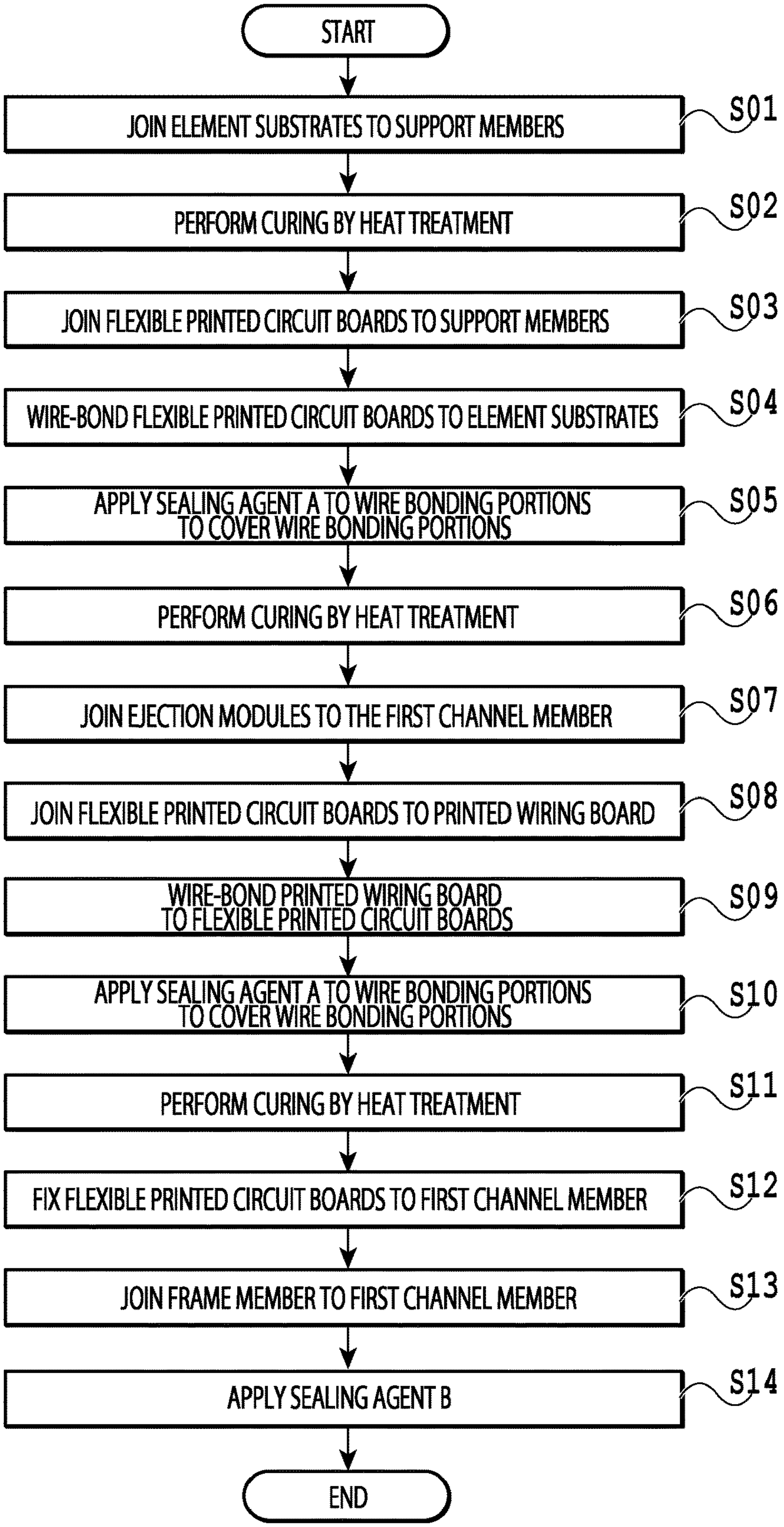
FIG. 10 is a flowchart illustrating steps of manufacturing a liquid ejection unit.

FIG. 10 is a flowchart illustrating steps of manufacturing the liquid ejection unit 300. Note that a sign "S" in explanation of each step means step in this flowchart. In the manufacturing of the liquid ejection unit 300, first, in S01, the element substrates 10 are joined to the support members 30 by using the adhesive agent A701. In S02, the adhesive agent A701 is cured by heat treatment. Then, in S03, the flexible printed circuit boards 40 are joined to the support members 30 by using the adhesive agent C703. In S04, the flexible printed circuit boards 40 are wire-bonded to the element substrates 10. In S05, the sealing agent A501 is applied to cover wire bonding portions.

In S06, the adhesive agent C703 and the sealing agent A501 are cured by heat treatment, and the ejection modules 200 are completed. In S07, the support members 30 are adhered to the recess portion of the first channel member 50 by using the adhesive agent B702, and the ejection modules 200 are thereby joined to the first channel member 50. Then, in S08, the printed wiring board 90 and the flexible printed circuit boards 40 are joined to one another. In S09, the printed wiring board 90 is electrically connected to the terminals 42 of the flexible printed circuit boards 40 by wire bonding. In S10, a sealing agent A is applied to the wire bonding portions of the flexible printed circuit boards 40 to cover the wire bonding portions.

Then, in S11, the sealing agent A is cured by heat treatment. Thereafter, in S12, the flexible printed circuit boards 40 are joined to the first channel member 50 by using the adhesive agent D704. Then, in S13, the frame member 130 is joined to the first channel member 50 by using the adhesive agent E705. In this case, the frame member 130 and the flexible printed circuit boards 40 are joined to each other by the adhesive agent E705. Thereafter, a sealing agent B (not illustrated in FIGS. 8 and 9) is applied between the frame member 130 and the element substrates 10, and the liquid ejection unit 300 is completed.

Note that, although an example in which the flexible printed circuit boards 40 are directly joined to the first channel member 50 by using the adhesive agent D704 is explained in the present embodiment, the present embodiment is not limited to this configuration, and the flexible printed circuit boards 40 may be joined to the first channel member 50 via another member.

As described above, an adhesive agent with a lower Young's modulus than the adhesive agent C703 bonding the flexible printed circuit board 40 and the support member 30 to each other is used as the adhesive agent D704 fixing the flexible printed circuit board 40 to the first channel member 50. A liquid ejection head with high reliability against a temperature change can be thereby provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-139519 filed Aug. 30, 2023, which is hereby incorporated by reference wherein in its entirety.

What is claimed is:

1. A liquid ejection head comprising:
an ejection module including:
an element substrate in which an element for ejecting liquid is provided;
a support member supporting the element substrate; and
a wiring board electrically connected to the element substrate; and
a channel member that supports the ejection module and in which a channel for supplying the liquid to be ejected by the element substrate is provided,
wherein the wiring board is adhered to the support member by a first adhesive agent, and is adhered to the channel member by a second adhesive agent,
wherein the support member is adhered to the channel member by a third adhesive agent, and
wherein a Young's modulus of the second adhesive agent after curing is lower than Young's moduli of the first adhesive agent and the third adhesive agent after curing.

2. The liquid ejection head according to claim 1, wherein the wiring board is a flexible printed circuit board, and an electrical connecting portion between the element substrate and the flexible printed circuit board is sealed by a first sealing agent.

3. The liquid ejection head according to claim 2, further comprising a frame member provided to surround the element substrate,
wherein the flexible printed circuit board is adhered to the frame member by a fourth adhesive agent, and
wherein a Young's modulus of the fourth adhesive agent after curing is lower than the Young's modulus of the first adhesive agent after curing.

4. The liquid ejection head according to claim 3, wherein the second adhesive agent and the fourth adhesive agent are the same adhesive agent.

5. The liquid ejection head according to claim 3, wherein the Young's modulus of the second adhesive agent after curing is equal to or lower than the Young's modulus of the fourth adhesive agent after curing.

6. The liquid ejection head according to claim 3, wherein a portion between the element substrate and the frame member is sealed by a second sealing agent.

7. The liquid ejection head according to claim 3, wherein the flexible printed circuit board is sandwiched between the channel member and the frame member, one surface of the flexible printed circuit board at a sandwiched position is adhered to the channel member by the second adhesive agent, and another surface of the flexible printed circuit board is adhered to the frame member by the fourth adhesive agent.

8. The liquid ejection head according to claim 1, wherein the Young's modulus of the first adhesive agent after curing is 0.4 GPa to 10 GPa, and the Young's modulus of the second adhesive agent after curing is 0.005 GPa to 0.5 GPa.

9. The liquid ejection head according to claim 8, wherein the Young's modulus of the third adhesive agent after curing is 0.4 GPa to 10 GPa.

10. The liquid ejection head according to claim 1, wherein the second adhesive agent contains an acrylic modified silicon resin.

11. The liquid ejection head according to claim 1, wherein the element substrate is adhered to the support member by a fifth adhesive agent, and the Young's modulus of the second adhesive agent after curing is lower than a Young's modulus of the fifth adhesive agent after curing.

12. The liquid ejection head according to claim 1, wherein the channel member is connected to a plurality of ejection modules.

* * * * *